(12) United States Patent
Gmeilbauer

(10) Patent No.: US 6,591,502 B1
(45) Date of Patent: Jul. 15, 2003

(54) TOOL FOR CUTTING OUT MOTOR VEHICLE WINDSCREENS

(76) Inventor: Engelbert Gmeilbauer, Stocketweg 1, Seefeld (DE), D-82229

( * ) Notice: Subject to any disclaimer, the term of this patent is extended or adjusted under 35 U.S.C. 154(b) by 0 days.

(21) Appl. No.: 09/830,659

(22) PCT Filed: Oct. 27, 1999

(86) PCT No.: PCT/DE99/03421
§ 371 (c)(1),
(2), (4) Date: Apr. 30, 2001

(87) PCT Pub. No.: WO00/24536
PCT Pub. Date: May 4, 2000

(30) Foreign Application Priority Data

Oct. 28, 1998 (DE) .................... 298 19 258 U

(51) Int. Cl.⁷ ............................................. B26B 27/00
(52) U.S. Cl. ...................................... 30/116; 30/272.1
(58) Field of Search ....................... 30/116, 124, 296.1, 30/314, 272.1; 83/13; 29/281.1

(56) References Cited

U.S. PATENT DOCUMENTS

| 3,310,082 A | * | 3/1967 | De La Tramerye | 30/116 |
| 3,711,677 A | * | 1/1973 | Cummins | 219/221 |
| 3,968,711 A | * | 7/1976 | Wilson | 83/171 |
| 4,215,475 A | * | 8/1980 | Morford et al. | 30/272.1 |
| 4,417,398 A | * | 11/1983 | Steck | 30/116 |
| 4,819,531 A | * | 4/1989 | Lawhon | 30/314 |
| 4,995,153 A | * | 2/1991 | Asbery | 30/116 |
| 5,622,093 A |   | 4/1997 | Hutchins | 83/13 |

FOREIGN PATENT DOCUMENTS

DE 196 23 635 A1 12/1997

* cited by examiner

Primary Examiner—Hwei-Siu Payer
(74) Attorney, Agent, or Firm—Ostrolenk, Faber, Gerb & Soffen, LLP

(57) ABSTRACT

A tool for cutting out motor vehicle windscreens is described, with a suction cup, a rotating head pivotable on the latter, a cutting wire and a spring between the rotating head and the end of the wire. The spring is a compression spring which is arranged between the rotating head and the inner end of the cutting wire so that the spring is compressed when the cutting wire is pulled, and extends when the wire is released, drawing the wire inwards.

15 Claims, 3 Drawing Sheets

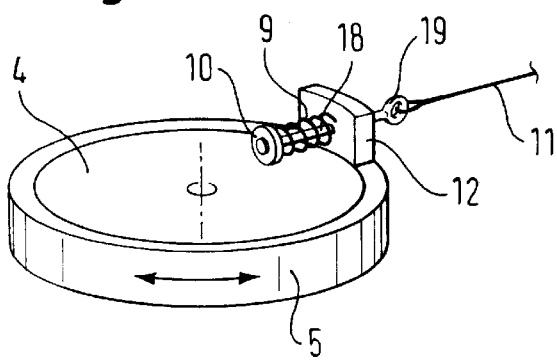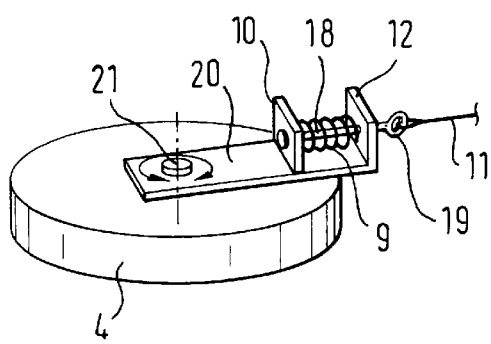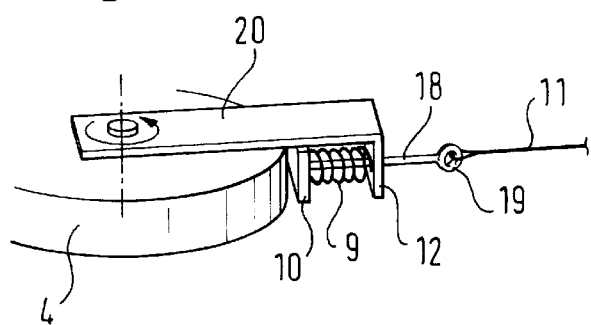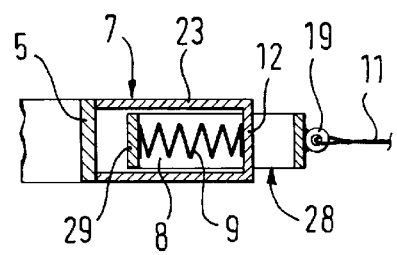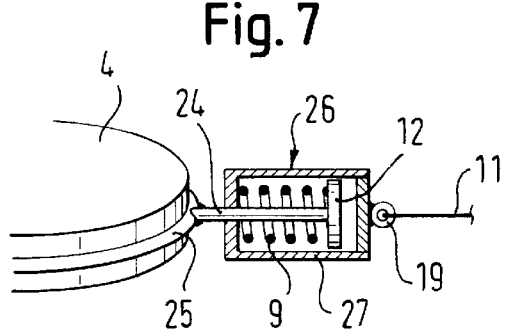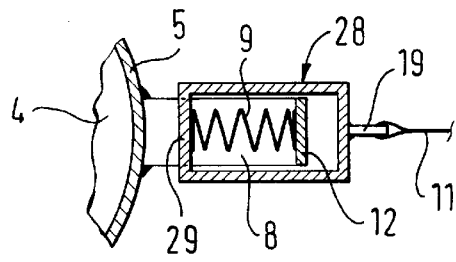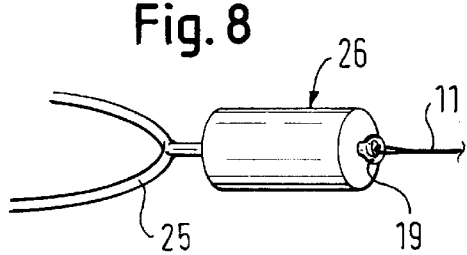

TOOL FOR CUTTING OUT MOTOR VEHICLE WINDSCREENS

This is a U.S. National stage of Application of No. PCT/DE99/03421 filed on Oct. 27, 1999. Priority is claimed on that application and on the following application:
Country: Germany Application No. 298 19 258.6 Filed on Oct. 28, 1998.

BACKGROUND OF THE INVENTION

The invention relates to a tool for cutting out motor vehicle windscreens.

Until now, motor vehicle windscreens, in particular front screens, were usually removed either with an oscillating knife or with a thin steel wire which exhibits a handle at each end.

The oscillating knife has the disadvantage that it cannot be used universally since the rubber seals or beads of adhesive to be cut are sometimes very thick and the knife can easily tilt and break, in particular in the radiused corners. In practice, this makes it necessary to purchase more knives fairly often, which is a considerable financial outlay. In addition, a costly oscillation machine and a power supply are required. The danger of injury due to incorrect use must not be underestimated.

With the wire design it is disadvantageous that two persons are required to carry out the work: one inside the car to hold the wire, and a second outside to guide the wire around the screen with continuous pulling and releasing movements, similar to sawing, after it has been passed through the bead of adhesive.

In addition, a device for removing vehicle windscreens is known from U.S. Pat. No. 5,622,093 or the Equalizer brochure, page 18 or 27 under the name "Side Winder". This device exhibits a suction cup which can be activated by means of a vacuum pump and secured to the windscreen on the inside. Secured rotatably to the upper side of the pot-shaped housing of the suction cup there is a rotating head which in turn is attached to a relatively long tension spring which is connected to the inner end of a cutting wire. When cutting, the wire passed through the bead of adhesive or seal is repeatedly pulled radially and released by means of a handle on the outside, through which the tension spring is correspondingly stretched and relaxed. As a result, the cutting wire describes a radial sliding movement in relation to the suction cup which movement, together with a tangential advance movement, produces a sawing cutting movement or action. As the rotating head is arranged on the upper outer side of the housing offset and therefore a relatively long distance axially from the active suction side, the result is a relatively high tipping moment when under tensile load and also under its own weight, for which reason a relatively high suction force is required which is applied by the vacuum pump. This entails a relatively complex structure for the suction cup itself and means that corresponding vacuum connections must be available at all times. In addition, the long tension spring is relatively a nuisance as when it is loose it sags under its own weight and can cause damage.

SUMMARY OF THE INVENTION

The object of the invention is to provide a tool of the kind named above which is simple and reliable in design and handling and can be operated purely by hand without additional equipment or vacuum connections.

Accordingly, the spring arranged between the rotating head and the cutting wire is a compression spring which is located between an outer tangential spring supporting wall and a wire holder displaceable radially inside the latter. In addition, the wire is connected to the wire holder so that the spring is compressed when the wire is pulled, and relaxed when the wire is released, during which the holder is displaced radially inwards and pulls the wire radially inwards. The active part, namely the spring, is now in the form of a compression spring and arranged radially inside the wire attachment point of the rotating head. When the wire is released, the spring is also released so that it is relaxed radially inwards with the result that when it is relaxed, the spring no longer sags downwards with the outer end of the cutting wire under its own weight, but the cutting wire remains supported uniformly at all times by the spring supporting wall through which it is passed.

It is particularly advantageous when a conventional hand-operated suction cup is used which exhibits a relatively low pot-shaped housing on the upper outer side of which the actuating lever for producing the necessary suction vacuum is provided. The use of a hand-operated suction cup has only become possible because no large heavy tension spring is needed any more.

According to the invention, the rotating head can be an arm which is secured rotatably to the upper side of the housing and extends radially and on the outer end of which the spring supporting wall is provided essentially extending perpendicularly upwards or preferably downwards. The wire holder takes the form of a disc the diameter of which is equal to or greater than the diameter of the spring, and the wire passed through spring and then through the spring supporting wall is secured centrally to the disc and passed through the wall. This allows a design which is very simple but more reliable in operation when a rod passed slidingly through the supporting wall is secured to the disc, and the wire is attached changeably to the end of the rod extending radially outwards through the disc. Thus, the spring is arranged concentrically around the rod and at the same time located between the disc and the supporting wall and is pressed against the supporting wall by means of the disc when the wire is pulled, and when released, the spring pushes the disc radially inwards and draws the rod with the wire attached to it inwards. The fact that the supporting wall preferably faces axially downwards towards the disc means that the point of attachment of the wire is moved axially very close to the windscreen so that the tipping moment is reduced by the maximum amount and thus the suction force of the suction cup need not be so high.

It is particularly advantageous when the rotating head is a rotating collar which sits concentrically on the external circumference of the suction cup housing so that it is displaceable pivotably but immovable axially, and the lower front face of the collar can lie on the motor vehicle windscreen when the suction cup is firmly secured. The fact that the rotating collar lies on the windscreen means that additional axial support is provided.

The spring supporting wall can be a continuation of the rotating collar extending axially upwards so that the entire compression spring assembly is located inside the diameter of the rotating collar so that an extremely compact space-saving embodiment is provided.

However, the spring supporting wall can also be arranged offset radially outwards on the outside circumference of the rotating collar and form a spring housing together with at least one radial supporting arm. Thus, the compression spring with the wire holder is located between the outside circumference and the spring supporting wall and is also supported laterally or axially on the at least one radial supporting arm. The fact that only tiny sawing movements have to be performed by the wire means, the compression spring can also be relatively short so that the radially projecting spring housing can be made relatively short with the result that its volume is not a nuisance as regards handling and storage.

It is advantageous when the wire holder takes the form of a plate slide which is displaceable in the spring chamber radially in relation to the suction cup and guided axially in relation to the spring.

When the wire holder slide is no longer connected directly to the wire passed through the spring supporting wall, but connected to a rod which is passed through the supporting wall and on the projecting end of which the wire is secured, then the slide-shaped wire holder is embodied like a piston which exhibits reliable operation.

Advantageously, the spring housing is provided with a wall which sits on the outer circumference of the rotating collar with a U-shape and forms a spring chamber in which the spring piston is then located. Here, the spring chamber can be closed all around, i.e. exhibit walls so that a spring housing is produced, with the result that the moving parts, namely the spring and wire holder, are encapsulated on the outside and shielded against dirt. At the same time, the danger of accident is largely reduced as jamming of fingers for example between the moving parts is prevented by the encapsulation. Here, the spring housing can exhibit a rectangular cross-section or be cylindrical according to the diameter of the compression spring used.

According to a further advantageous embodiment, the rotating head can also be a narrow rotating ring which is arranged rotatable centrally and immovable axially on the outer surface of the suction cup housing. The piston rod of a spring cylinder is secured on this rotating ring so that it projects radially, so that the spring supporting wall is the piston of the cylinder while the wire holder is the cylinder through whose radially inner end wall the piston rod is passed, and on the inside the spring is supported on one side on this end wall. The spring is arranged between the inner end wall and the piston of the cylinder while the outer wall of the cylinder is used to secure the cutting wire. This spring cylinder can also be very short and compact, with only a very short spring stroke, so that overall a space-saving and at the same time reliable design is also provided here.

BRIEF DESCRIPTION OF THE DRAWINGS

In the following, the inventions explained in greater detail on the basis of a plurality of embodiment examples with reference to the drawing in which:

FIG. 4 shows a perspective view of a suction cup with a rotating collar and a spring supporting wall secured axially in it;

FIG. 5 shows a suction cup with a rotating arm with a spring supporting wall facing axially upwards;

FIG. 6 shows a view as in FIG. 5, with a spring supporting wall facing vertically downwards on the rotating arm;

FIG. 7 shows a part view of a suction cup with a rotating ring with a spring cylinder secured to it in an axial section;

FIG. 8 shows a perspective view of an embodiment according to FIG. 7, with a rotating ring and a spring cylinder;

FIG. 9 shows a partial axial section through an embodiment with a rotating collar and a yoke spring cylinder;

FIG. 10 shows a horizontal section through the embodiment according to FIG. 9;

DETAILED DESCRIPTION OF THE PREFERRED EMBODIMENTS

Figure 1:
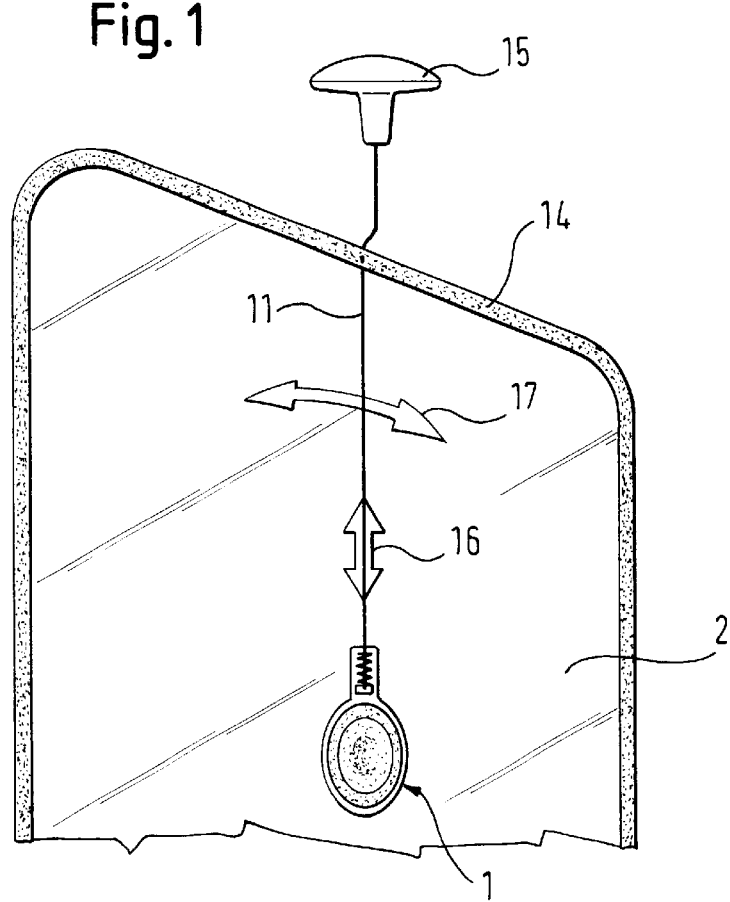
FIG. 1 shows a view of a tool according to the invention in use.

As can be seen from FIG. 1, the tool according to the invention consists of a suction cup 1 which serves as an element for securing the tool to a motor vehicle windscreen 2. Here, the suction cup 1 is of a conventional design which works on the known vacuum principle as used for example in holding and lifting tools for fairly large sheets of glass. Here, as can be seen more particularly in FIG. 2 and in FIGS. 11 to 13, the central area of the suction cup placed with its rubber base on the glass is raised by operating a lever 3 so that the outer area is pressed firmly against the glass by vacuum so that a firm connection is produced.

Figure 2:
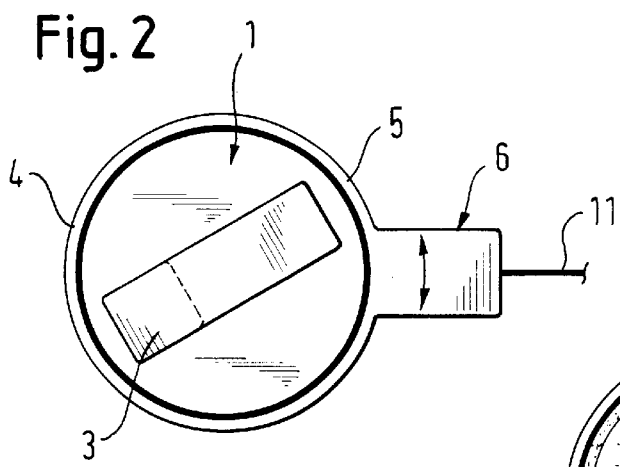
FIG. 2 shows a plan view of the suction cup with a rotating collar and a spring housing.
Figure 3:
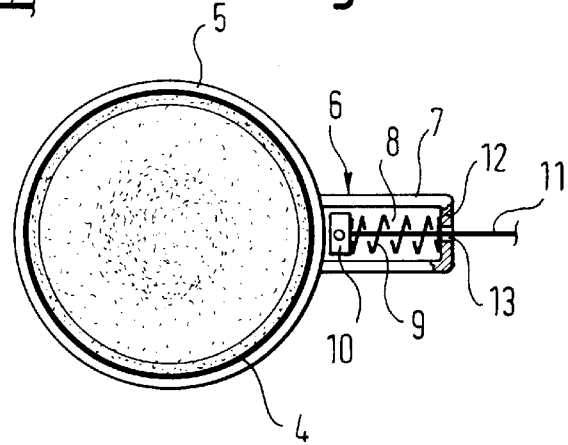
FIG. 3 shows a view from below of the suction cup according to FIG. 2.

As can be seen from FIGS. 1 to 3, the essentially pot-shaped housing 4 of the suction cup 1 is surrounded over its entire circumference by a rotating collar 5 so that it can be rotated easily through 360° in both directions of rotation, but sits immovable axially. The height of the rotating collar can essentially be the same height as the housing 4. Here, a spring cylinder 6 is mounted on the rotating collar 5. The spring cylinder 6 consists of a spring housing 7 which is secured to the collar and is preferably enclosed on all sides and contains a concealed spring chamber 8. This spring chamber 8 contains a wire holder 10 which is displaceable radially, i.e. in the longitudinal direction of the spring chamber, against the force of a compression spring 9. A cutting wire 11, which is secured at its inner end to the wire holder 10, is passed centrally through the spring 9 and run out through the outer end wall of the spring housing 7 which forms the spring supporting wall 12, or through a bore 13 in this wall. In the active state, the other end of the cutting wire 11 is passed through the bead of adhesive 14 or rubber seal and a handle 15 is secured to its outer end.

A windscreen can be released easily, conveniently and rapidly with this tool. To do this, the suction cup 1 is positioned with its rubber base in the middle of the windshield 2 inside the vehicle and the lever 3 on the side of the suction cup remote from the screen is operated to produce the vacuum. This secures the suction cup to the screen. Now, the end of the cutting wire 11 remote from the suction cup is pushed through the bead of adhesive 14 or the windscreen rubber seal between the body and the screen to the outside. On the outside, the cutting wire 11 is pulled until it is taut and the spring cylinder 6 with the rotating collar 5 turns in the direction of the pulling person. The end of the wire is then secured in the conventional handle 15 in a manner known per se. When this is done, the length of the wire is in each case adjusted so that in relation to the screen there is always a clearance of approximately 10–20 cm to the screen. Now, the T-handle 15 with the wire can be guided around the screen with a sawing movement, i.e. pulling and releasing the sawing wire in the longitudinal direction of the wire, in the direction of the arrow 16 and simultaneous guiding and pivoting movements in the direction of the arrow 17. When this is done, the bead of adhesive 14 is cut and the screen is detached from the body.

In the embodiment example shown in FIG. 4, the rotating collar 5 which can pivot around the housing 4, has a spring supporting wall 12 which is secured axially to the latter and projects axially upwards. A rod 18, to whose inner end a disc-shaped wire holder 10 is secured and which is passed through a compression spring 9, is passed through the bore through the spring supporting wall 12 which cannot be seen here. At the other end of the rod 18 projecting out of the spring supporting wall 12 there is an eye 19 which firstly serves as a stop for the inward movement when the cutting wire is released, and secondly serves to secure the inner end of the cutting wire 11. However, a stop disc secured on the rod 18 in front of the eye 19, can also serve as a stop when the wire is released.

In the embodiment shown in FIG. 5, a rotating arm 20 is secured to the upper side of the suction cup housing 4, so that it is pivotable through 360° about the axis 21 of the housing 4. Attached at the outer end of the rotating arm 20 there is a spring supporting wall 12 which projects perpendicularly and at the same time axially upwards in relation to the housing 4 and through which is passed the rod 18 on which is provided firstly a rectangular wire holder 10 and secondly an eye 19 for securing the wire. The compression spring 9 is located under preload between the wire holder 10 and the spring supporting wall 12. It can be seen in FIG. 5 that the rotating arm 20 can also be so short that the spring supporting wall 12 comes to lie inside the outer circumference of the housing 4, so that the design can be made more compact overall.

The embodiment in FIG. 6 is designed in a similar manner to the embodiment in FIG. 5, with the difference that the supporting wall and the wire holder 10 and the spring 9 extend axially downwards onto the windscreen when installed. As a result, the entire spring-loaded wire pulling device is offset downwards a large amount, producing a more positive force or moment ratio, and the tipping moment produced by the rotating arm 20 is reduced considerably. In addition, here the wire holder 10 can also play the part of the stop for the relaxation movement when the wire is released in that it bears on the circumference of the housing 4 when released. When released, the wire holder 10 can bear relatively firmly on the housing 4, depending on the design of the compression spring 9, so that the rotating arm 20 is firmly braked so that it cannot pivot from an upper position to a lower position under its own weight.

FIG. 7 shows a further embodiment example in which a rotating ring 25 is mounted so that it is displaceable pivotably, but immovable axially on the outer circumference of the housing 4. Mounted on this rotating ring 25 there is a spring cylinder 26 which is designed like a single-acting cylinder. Here, a cylindrical spring housing 27 is provided which at the same time plays the part of the wire holder. The spring supporting wall 12, which here is constructed like a piston, is provided inside the spring housing 27. On the piston spring supporting wall 12 there is a piston rod 24 which passes through the inward facing end wall of the spring housing 27 and is secured rigidly to the rotating ring 25, as can also be seen in FIG. 8. The eye 19 for securing the cutting wire 11 is attached on the other end side of the spring housing.

FIGS. 9 and 10 show a further embodiment example. As can be seen in particular in FIG. 9, a U-shaped spring housing is mounted on the rotating collar 5. The parallel limbs 23 of the spring housing terminate flush with the end sides of the rotating collar 5 on the outside, while the vertical connecting wall forms the spring supporting wall 12. Here, the wire holder takes the form of a rectangular wire holder yoke which engages with its inner wall 29 between the walls 23 of the spring housing 7. The compression spring 9 is located under preload in the spring chamber 8 formed between the walls 12, 23 and 29. An eye 19 for securing the cutting wire is provided on the outer end side of the wall of the wire holder yoke 28.

Figure 11:
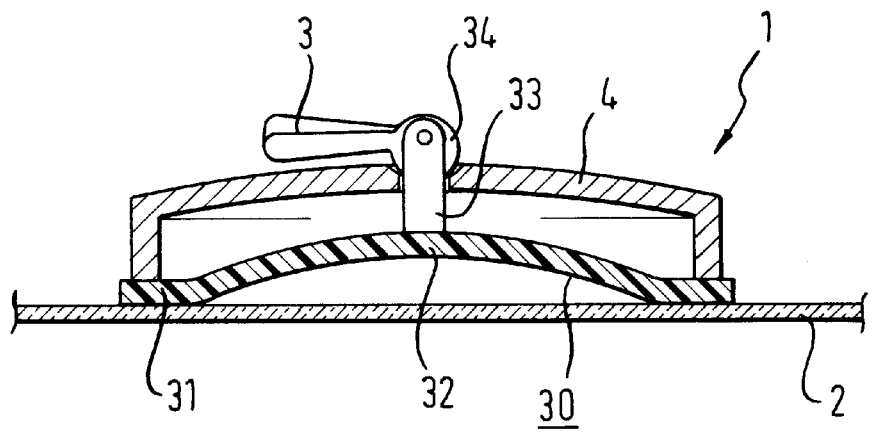
FIG. 11 shows an axial section through a conventional hand-operated suction cup, in the secured state.

FIG. 11 shows a conventional hand-operated suction cup 1. It can be seen that this consists of a pot-shaped housing 4 on the underside of which a disc-shaped rubber base 30 is arranged concentrically so that its outer area 31 projects radially beyond the outer surface of the housing 4. An arm 33 is mounted in the middle area 32 of the rubber base 30 so that it projects vertically upwards through the housing 4. The lever 3, which has an eccentric 34 at its end facing the housing, is located at the projecting end of the arm 33.

Figure 12:
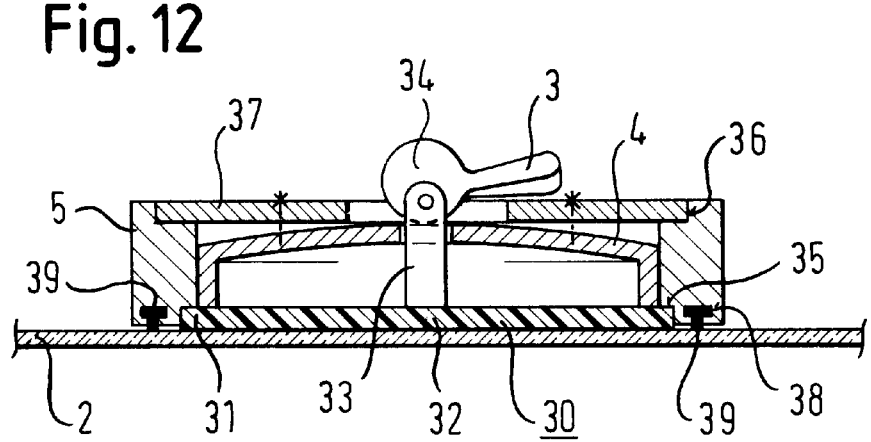
FIG. 12 shows an axial section through a suction cup in a further variant according to the invention with a supporting rotating collar, in a relaxed state.

It can be seen in FIG. 12 that according to the invention a rotating collar 5 is provided concentric with the external surface. On its lower end side the rotating collar 5 exhibits an annular step 35 which through its shape encloses the outer area 31 of the rubber base 30 upwardly and radially so that it bears flush on the latter, but remains pivotable in relation to it. On the upper end side the rotating collar 5 exhibits a further inner annular step 36 in which a disc 37 flanged on the upper side of the housing 4 engages by virtue of its shape so that the rotating collar still remains perfectly rotatable, but at the same time is adequately protected against axial displacement and falling out by the disc 37 and the rubber base 30. On the lower end side the rotating collar 5 also exhibits an annular groove 38 which is open on the underside and in which an annular lip seal 39 is introduced so that it projects out of the lower end surface of the rotating collar 5 so far that it bears snugly on the windscreen 2 and at the same time supports the rotating collar 5 on the screen.

Figure 13:
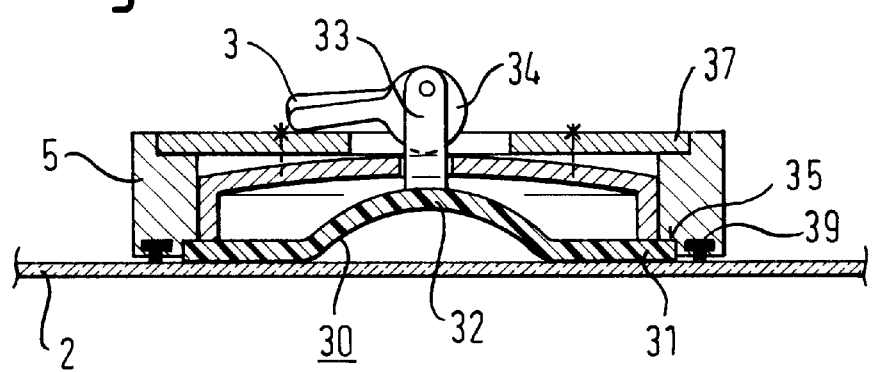
FIG. 13 shows a section as in FIG. 12, with the suction cup in the secured state.

With the suction cup 1 in the secured position on the windscreen as shown in FIG. 13, it can be seen that the outer area 31 is secured on the screen 2 by the annular step 35, while the annular lip seal 39 helps to seal the outer area. Thus, when secured by the vacuum, the middle area 32 will exhibit a narrower bell shape as the edge area 31 remains firmly pressed on the screen 2 over a larger radial extension. The annular seal 39 is preferably a Teflon ring which allows the rotating ring to stand securely supported on the windscreen 2 and permits the rotating collar 5 to rotate or pivot freely during the cutting operation in spite of the rotating collar 5 sealing and bearing firmly axially through the annular seal 39.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A tool for cutting out a motor vehicle windscreen, comprising:

a suction cup securable to an inner side of the windscreen;

a rotating head secured concentrically on the suction cup so as to be pivotable through 360°;

a cutting wire having a first end attached to the rotating head and a second end with a handle;

a compression spring arranged between the rotating head and the first end of the wire so that the compression spring is compressed when the cutting wire is pulled and extends when the wire is released drawing the wire inwards; and an outer tangential spring supporting wall provided on the rotating head and a wire holder displaceable radially inside the rotating head, the spring being provided between the supporting wall and the wire holder, the cutting wire being connected to the wire holder so that the spring is compressed when the wire is pulled, and relaxed when the wire is released, and the holder is displaced radially inwards when released so as to draw the wire radially inwards.

2. A tool according to claim 1, wherein the suction cup is a hand-operated suction cup having a pot-shaped housing on an upper outer side of which an operating lever is provided.

3. A tool according to claim 2, wherein the rotating head is a rotating arm which is secured rotatably on the upper side of the housing and extends radially and at an outer end of which the spring supporting wall projects essentially perpendicularly one of upwards and downwards, the wire holder being a disc having a diameter at least equal to a diameter of the spring, the wire being arranged to pass through the spring and is secured centrally to the disc.

4. A tool according to claim 2, wherein the rotating head is a rotating collar which sits concentrically on an outside circumference of the suction cup housing so as to be displaceable pivotably but immovable axially, and so that when the suction cup is secured by suction a lower end surface of the collar bears on the windscreen.

5. A tool according to claim 4, wherein the spring supporting wall is an extension of the rotating collar extending axially upwards.

6. A tool according to claim 4, wherein the spring supporting wall is arranged offset radially outwards on an outside circumference of the rotating collar and together with at least one radial supporting arm forms a spring housing.

7. A tool according to claim 6, wherein in a radial plane the spring housing has a U-shaped wall which sits on an outside circumference of the rotating head so as to form a spring chamber.

8. A tool according to claim 7, wherein the wire holder is one of slide and a piston displaceable in the spring chamber and guided one of radially in relation to the suction cup and axially in relation to the spring.

9. A tool according to claim 8, wherein the U-shaped wall is aligned vertically and open in a horizontal direction, and the wire holder is a frame-shaped yoke which fits horizontally around the spring supporting wall, the cutting wire being secured to a front wall of the yoke.

10. A tool according to claim 4, wherein the spring supporting wall is arranged offset radially outwards on an outside circumference of the rotating collar and together with at least one radial supporting arm forms a spring housing, in a radial plane the spring housing having a U-shaped wall which sits on an outside circumference of the rotating head so as to form a spring chamber, and further comprising a rod passed axially through the spring and secured to the wire holder and passed displaceably through the spring supporting wall so as to project form the wall when the spring is in a relaxed state, the rod having a projecting end with an eye which the cutting wire is releasably secured.

11. A tool according to claim 4, wherein the rotating collar has a lower end surface with an annular step which has an open bottom and is open inside, the rotating collar being shaped to fit flush around an outer area of a rubber bottom of the suction cup when the suction cup is in a relaxed state.

12. A tool according to claim 11, wherein the rotating collar has an upper end side with an annular step which has an open top and is open inside, and further comprising a disc secured to the upper side of the suction cup housing so as to engage with its outer circumferential area by virtue of its shape and prevent axial upward displacement of the rotating collar.

13. A tool according to claim 11, wherein the lower end surface of the rotating collar has an annular groove which is open towards the bottom, an annular lip seal being secured in the annular groove so as to bear snugly on the windscreen when the suction cup is in position.

14. A tool according to claim 13, wherein the annular seal is a Teflon ring.

15. A tool according to claim 2, wherein the rotating head is a relatively narrow rotating ring secured to an outer surface of the suction cup housing so as to be essentially rotatable centrally and immovable axially, and further comprising a spring cylinder having a piston rod secured to the rotating ring so as to project radially, the spring supporting wall being the piston of the cylinder and the wire holder is a housing of the spring cylinder through a radial inner wall of which the piston rod is passed and on which the spring is supported on the inside, the spring being supported and the cutting wire being secured on an outer end wall of the spring cylinder housing.

* * * * *